United States Patent
Haugan et al.

(10) Patent No.: US 11,764,583 B2
(45) Date of Patent: Sep. 19, 2023

(54) ENERGY DISTRIBUTION SYSTEM

(71) Applicant: Siemens Energy AS, Oslo (NO)

(72) Inventors: Espen Haugan, Trondheim (NO); Alf Olav Valen, Jakobsli (NO)

(73) Assignee: Siemens Energy AS, Oslo (NO)

( * ) Notice: Subject to any disclaimer, the term of this patent is extended or adjusted under 35 U.S.C. 154(b) by 0 days.

(21) Appl. No.: 17/786,395

(22) PCT Filed: Dec. 21, 2020

(86) PCT No.: PCT/EP2020/087417
§ 371 (c)(1),
(2) Date: Jun. 16, 2022

(87) PCT Pub. No.: WO2021/130158
PCT Pub. Date: Jul. 1, 2021

(65) Prior Publication Data
US 2023/0009250 A1 Jan. 12, 2023

(30) Foreign Application Priority Data

Dec. 23, 2019 (GB) .................................... 1919138

(51) Int. Cl.
*H02J 3/38* (2006.01)
*H02J 1/10* (2006.01)
*H02J 3/32* (2006.01)
*H02J 5/00* (2016.01)
*H02M 3/42* (2006.01)

(52) U.S. Cl.
CPC .............. *H02J 3/381* (2013.01); *H02J 1/102* (2013.01); *H02J 3/32* (2013.01); *H02J 5/00* (2013.01); *H02M 3/42* (2013.01); *H02J 2310/42* (2020.01)

(58) Field of Classification Search
CPC .... H02J 3/38; H02J 3/381; H02J 1/102; H02J 1/10; H02J 3/32; H02J 5/00; H02J 2310/42; H02M 3/42
See application file for complete search history.

(56) References Cited

U.S. PATENT DOCUMENTS

| | | |
|---|---|---|
| 2010/0284117 A1 | 11/2010 | Crane |
| 2016/0009354 A1 | 1/2016 | Lai et al. |
| 2017/0133858 A1 | 5/2017 | Pan et al. |

FOREIGN PATENT DOCUMENTS

CN 209454733 U 10/2019

OTHER PUBLICATIONS

International search report and written opinion dated Apr. 23, 2021 for corresponding PCT/EP2020/087417.

*Primary Examiner* — Robert L Deberadinis
(74) *Attorney, Agent, or Firm* — WOLTER VAN DYKE DAVIS, PLLC

(57) ABSTRACT

An electrical energy distribution system for a vessel or platform includes a plurality of DC buses, each DC bus coupled to a corresponding energy storage bus; each energy storage bus being coupled to a neighboring energy storage bus of the system through a first DC/DC converter. The plurality of energy storage buses are connected together to form a ring. Each energy storage bus is further coupled to an energy store through a second DC/DC converter.

10 Claims, 4 Drawing Sheets

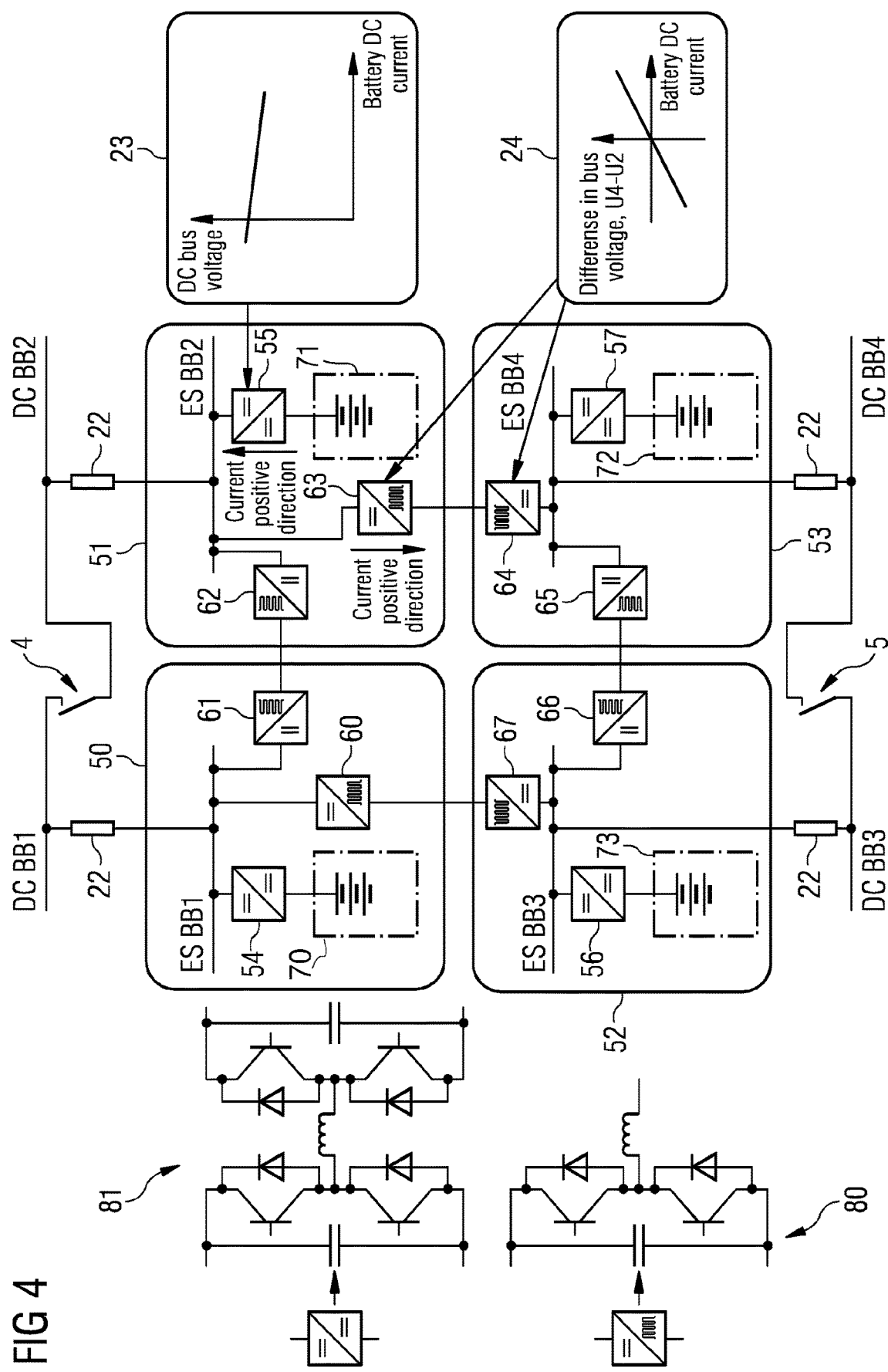

ENERGY DISTRIBUTION SYSTEM

CROSS REFERENCE TO RELATED APPLICATIONS

This application is the U.S. National Stage of International Application No. PCT/EP2020/087417 filed 21 Dec. 2020, and claims the benefit thereof. The International Application claims the benefit of United Kingdom Application No. GB 1919138.6 filed 23 Dec. 2019. All of the applications are incorporated by reference herein in their entirety.

FIELD OF INVENTION

The present disclosure relates to an energy distribution system, in particular for distribution of electric energy on a vessel, or rig, including a ship or platform and to a method of operating an energy distribution system.

BACKGROUND OF INVENTION

For operating a vessel, in particular a ship or a platform, e.g. oil exploration platform, electric energy may need to be distributed to a number of consumers, such as thrusters and pumps, which are to be operated on a vessel. In addition, the vessel or platform may carry out other tasks, such as drilling, that generate excess energy that needs to be dissipated. The electric energy may be generated by prime movers, such as diesel engines and generators. The excess energy may be dissipated in braking resistors. The vessel or platform may comprise essential components that need to be supplied with electric energy even in the case of a failure of some part of the energy distribution system. It is desirable to provide an improved energy distribution system.

SUMMARY OF INVENTION

In accordance with a first aspect of the present invention, an electrical energy distribution system for a vessel or platform comprising a plurality of DC buses, each DC bus coupled to a corresponding energy storage bus; each energy storage bus being coupled to a neighbouring energy storage bus of the system through a first DC/DC converter; wherein the plurality of energy storage buses are connected together to form a ring; and wherein each energy storage bus is further coupled to an energy store through a second DC/DC converter.

The first DC/DC converter may comprise two pairs of parallel connected transistor diode arrangements connected through an inductor.

The system may further comprise physically separated zones, each zone being coupled to one adjacent zone by the first DC/DC converter comprising one of a parallel connected transistor diode arrangement, or a pair of parallel connected transistor diode arrangements, and an inductor; and to the other adjacent zone by a third DC/DC converter comprising a pair of parallel connected transistor diode arrangements and an inductor.

The system may comprise at least three DC buses and at least three energy storage buses.

The system may further comprise at least a primary energy source; wherein the primary energy source comprises an AC generator connected to an AC bus; wherein the AC bus is coupled to the or each DC bus via a transformer and an AC to DC converter The system may further comprise an intermediate AC bus at a lower voltage than the AC bus.

The energy storage may comprise one of a battery, bank of batteries, capacitors, supercapacitors, or flywheels.

The plurality of DC buses may comprise normally open switches between adjacent DC buses.

In accordance with a second aspect of the present invention, a method of operating an electrical energy distribution system according to the first aspect comprises detecting a voltage difference between an energy storage device and a DC bus and allowing current flow from the higher voltage to the lower voltage.

The or each energy storage device may charge when there is an excess of energy on any of the DC buses and discharges to a consumer connected to any of the DC buses when the voltage of the DC bus is lower than the voltage of the energy bus for that energy storage device.

BRIEF DESCRIPTION OF THE DRAWINGS

An example of an energy distribution system according to the present invention will now be described with reference to the accompanying drawings in which.

DETAILED DESCRIPTION OF INVENTION

The present disclosure addresses the need to provide a system for distribution of electrical energy on a vessel or platform, which is able to maintain supply to essential consumers and reduce wastage of energy generated during drilling operations. In offshore drilling systems large amounts of braking energy is regenerated from the drilling operation, as without this the drill string would accelerate into the well, potentially causing damage to the drill or other equipment. As the braking resistors get hot when dissipating the braking energy and make steam, which can be hazardous to operatives on the deck, as well as taking up a lot of space on the deck of the rigs or vessels, then the operators wish to reduce or eliminate the use of braking resistors in drilling operations. A further problem is that sea water is an aggressive environment which may damage the resistors by corrosion over time.

Figure 1:
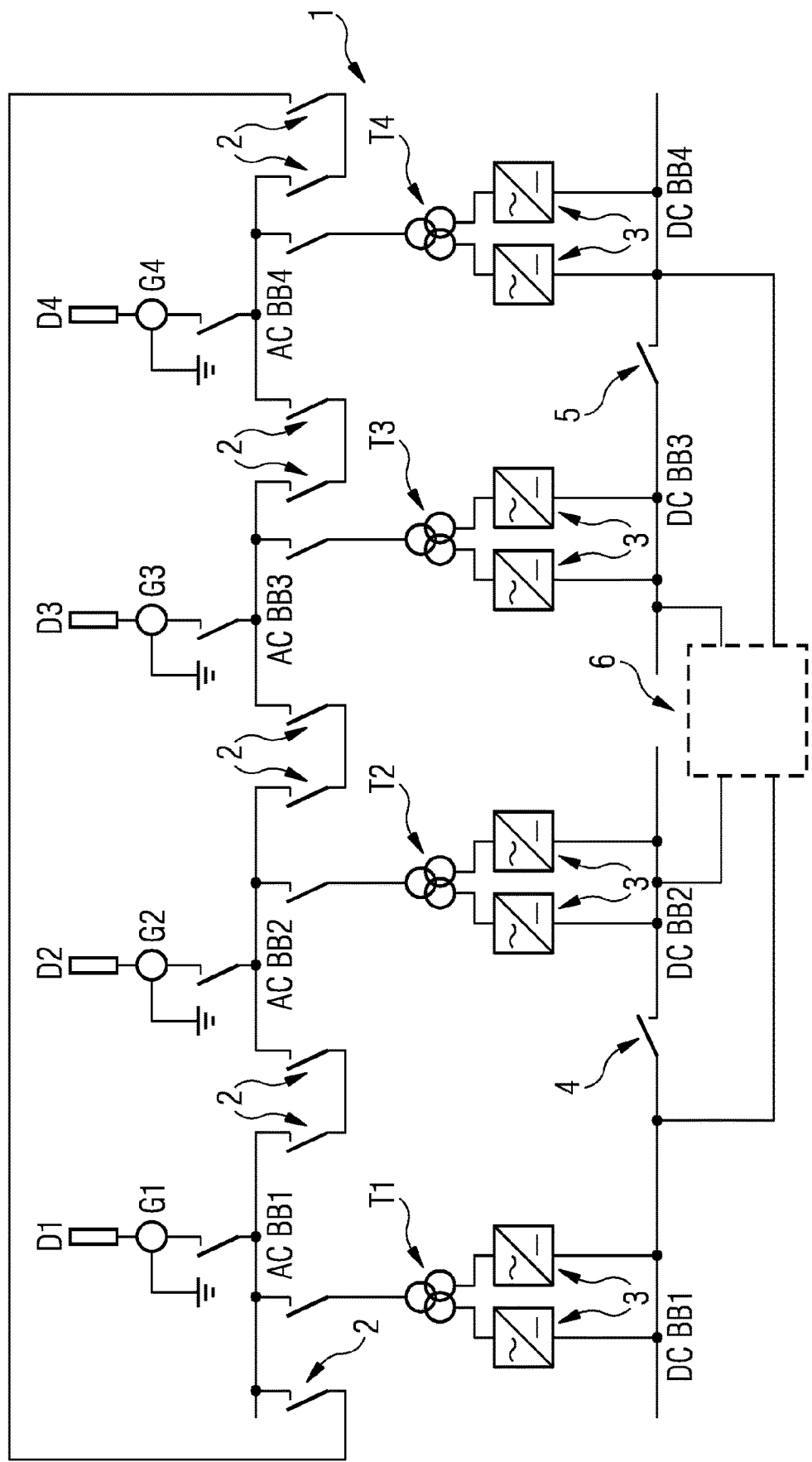
FIG. 1 illustrates an example of an energy distribution system according to an embodiment of the present invention.

FIG. 1 illustrates an example of an energy distribution system 1 for generating and distributing electrical energy on a vessel or platform with enhancements provided by the system of the present invention. The system is illustrated with main AC switchboard comprising a series of AC bus bars AC BB1, AC BB2, AC BB3 and AC BB4 which may be connected together in a ring by pairs of switches 2, normally closed in operation. Prime movers, such as diesel engines D1, D2, D3, D4 feed AC electrical generators G1, G2, G3, G4 to develop AC power for the AC buses. For example, the diesel engines may supply up to 10 MW each and the supply to the AC buses may be up to 15 kV, 60 Hz AC. The ring arrangement allows for one or more engines to be shut down in periods of low load and the energy from the remaining minimum number of diesel engines to be generated by operating those engines at close to full power.

Switches connecting the AC busbars to each other, generators, or consumers, or transformers, provide galvanic isolation.

The AC buses may supply AC consumers, not shown, as well as supplying power via uni-directional transformers T1, T2, T3, T4 to the DC busbars DC BB1, DC BB2, DC BB3 DC BB4 through AC to DC converters 3, typically a diode rectifier arrangement permitting current flow in only one direction. The rectifiers may comprise a simple diode arrangement, or other rectification arrangements, with diode functionality from the rectifier blocking energy flow from the DC busbars back to the AC busbars. An intermediate AC switchboard (not shown), at a lower voltage, may be provided between the main AC switchboard, or AC busbars and the DC switchboards, or busbars, providing a first stage of transforming down the AC voltage, for example to 11 kV. Pairs of DC busbars DC BB1, DC BB2 and DC BB3, DC BB4 may be connected together if required by closing switches 4, 5 respectively.

The present invention provides an improvement to existing energy distribution arrangements by incorporating an energy storage ring bus 6 in the energy distribution system 1 of FIG. 1. Conventionally, energy storage has been used directly connected to the AC busbars to smooth supplies to consumers that are also connected to those busbars and in drilling operations, braking resistors have been connected to the DC busbars to dissipate the large amounts of excess energy regenerated in the drilling operation, as the drill string is lowered into the drill hole. This is convenient in that it allows additional energy storage to be added in parallel to the AC bus, or more braking resistors added in parallel to the DC bus, if the amount available was not sufficient to cope with the excess energy required or generated.

Figure 2:
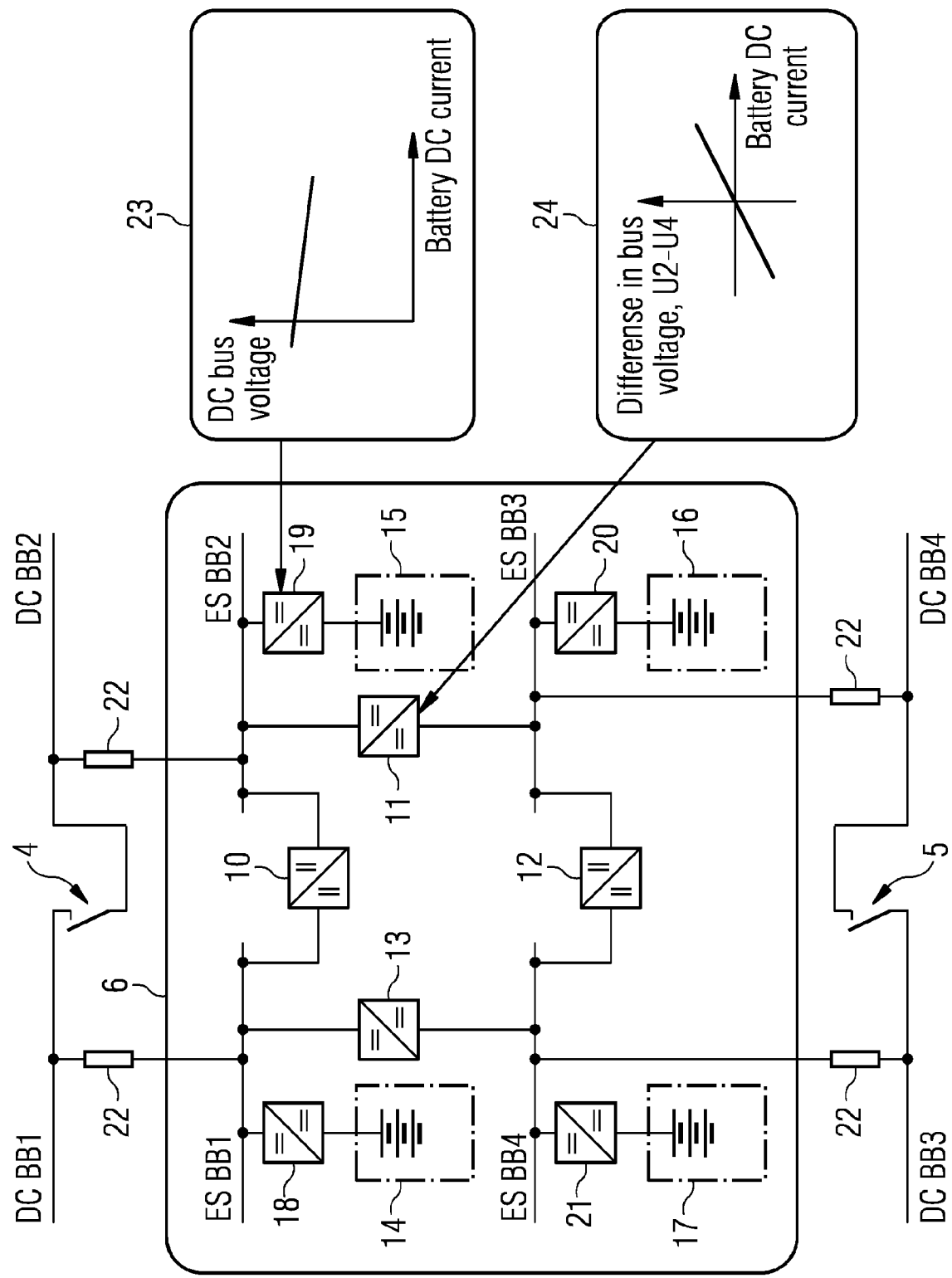
FIG. 2 illustrates a first example of part of the energy distribution system of FIG. 1 in more detail.

The energy storage ring bus 6 may take several different forms. A first example is shown in FIG. 2. In this example, four energy storage bus bars ES BB1, ES BB2, ES BB3 and ES BB4 are connected together in a ring by DC choppers, i.e. DC to DC converters 10, 11, 12, 13, typically transistor regulated converters. The energy bus bars ES BB1, ES BB2, ES BB3 and ES BB4 may be connected to their respective DC bus bar DC BB1, DC BB2 and DC BB3, DC BB4 through fuses 22. Each energy storage busbar is also connected to an energy store 14, 15, 16, 17 through respective DC/DC converters, or choppers, 18, 19, 20, 21. In the examples shown, the energy storage 14, 15, 16, 17 comprises batteries, or battery banks chosen to have a predetermined capacity, in terms of kWh, according to the application for which they are being used. A typical capacity for drilling operations would be in the region of 400 kWh to 2000 kWh per energy store. However, other forms of energy storage, such as capacitor banks, supercapacitors, or flywheels may be used. A control characteristic 22 of DC bus voltage against battery DC current, for each DC bus and its associated battery, is illustrated for the battery choppers 18, 19, 20, 21. The characteristic assumes a current positive direct from the battery towards the DC bus. The DC/DC converters may be used to control supply of charge to the batteries 15, 16, 17, 18 and to match the battery voltage to the operating voltage of DC consumers on the DC busbars. The DC/DC choppers 10, 11, 12, 13 in the ring have a distinct characteristic derived from the difference in bus voltage for the two buses between which the choppers are located e.g. U2-U4 for chopper 11, plotted against battery DC current for battery 15. In this example, the characteristic assumes a current positive direction from DC bus DC BB1 to DC bus DC BB4. For battery 16, only the level of the bus voltage where the battery is connected will determine the battery current according to curve 23.

Current flow is controlled by the voltage difference at different points of the circuit. If the voltage is within a predetermined safe operating range of the components, then current flow occurs automatically from higher voltage to lower voltage. For example, an increase in voltage in either of DC BB2, or ES BB2 (as, in practice, there is no voltage drop between these switchboards), may give rise to a current flow toward an adjacent busbar e.g. BB1 or BB3 that is at a lower voltage. In normal operation, the control is carried out by the voltage differences in the system alone. By default, an excess of voltage on BB2 would attempt to store that energy in its own energy store 15 first. Only, if that store is close to capacity will the excess voltage be channeled to another energy storage busbar, e.g. ES BB1 or ES BB3 via the choppers 10, 11 respectively.

Regenerative power from drilling operations goes back to the DC busbar and thence into the corresponding island, from where the energy storage ring allows that regenerative energy to be supplied to a neighbouring busbar or neighbouring energy store. For example, if the local energy store 15 is close to full capacity, e.g. at 85% charge and it is known that regeneration is expected by virtue of the stage of a drilling operation that has been reached, then one option is to reduce the battery charge level to nearer half by using the stored energy to supply a consumer on the DC bus, rather than taking more energy for that consumer from the AC bus. The system may then ensure that each battery is topped up before energy is dissipated, for example by directing excess energy to braking resistors connected to the DC busbars, as a last resort. However, far fewer braking resistors are needed than would be the case with a conventional drilling energy distribution system, so the concerns of the operators regarding the amount of space taken up by the braking resistors and the potential for harm to operatives working on the deck close to the braking resistors are reduced.

If the voltages are outside the safe operating range of the components, then other mechanisms are triggered to prevent overcharging, using an overall system control, which may be a centralised, or distributed control system taking data from sensors (not shown) to enable suitable steps to be taken. Another benefit, in this example, with four islands in a power distribution network for drilling operations, is that there is no need to connect the busbars directly by switches 4, 5 in the system. The choppers are able to provide both static protection in case of a DC bus system failure and current or power regulation between the islands, allowing for different voltage levels for different DC systems. Thus, if a single failure occurs, only one of the islands fails e.g. DC BB1 and the choppers 10, 13 cut that island off from the other islands by means of current sensing and a current level. The remaining islands continue to be able to store and extract energy and share excess energy via choppers 11, 12 on the energy storage ring. The regulation principle for the chopper 18, 19, 20, 21 connected between a battery and a DC bus is conventional droop regulation. Regulation of the interconnected choppers 10, 11, 12, 13 between the energy busses uses the difference in voltage to regulate the current flow.

The use of an energy storage ring on the DC bus has the benefit that when the DC drilling system is interconnected by the energy storage ring, the braking energy flows freely across the total DC system and can be reused by consumers instead of being burnt up in the braking resistors. Where there is too much energy from braking, this energy may be stored in the energy storage system instead. An additional benefit is that the total current that can be handled in the system is increased. For a typical 2000 A rated component, such as a DC chopper in an offshore drilling application, the energy storage ring increases that total in direct relation to the number of choppers in the ring, thereby a further 6000 A can be removed, as compared with a conventional energy distribution system. Furthermore, energy storage in this form can be introduced into equipment with only minor modification of the existing DC system, i.e. by adding a connection from each DC busbar to its corresponding energy storage busbar. The energy storage ring provides an interconnection between bus bars in an energy distribution system, in particular those used for drilling operations or vessels with multiple thrusters which can then be interconnected to provide redundancy.

Figure 3:
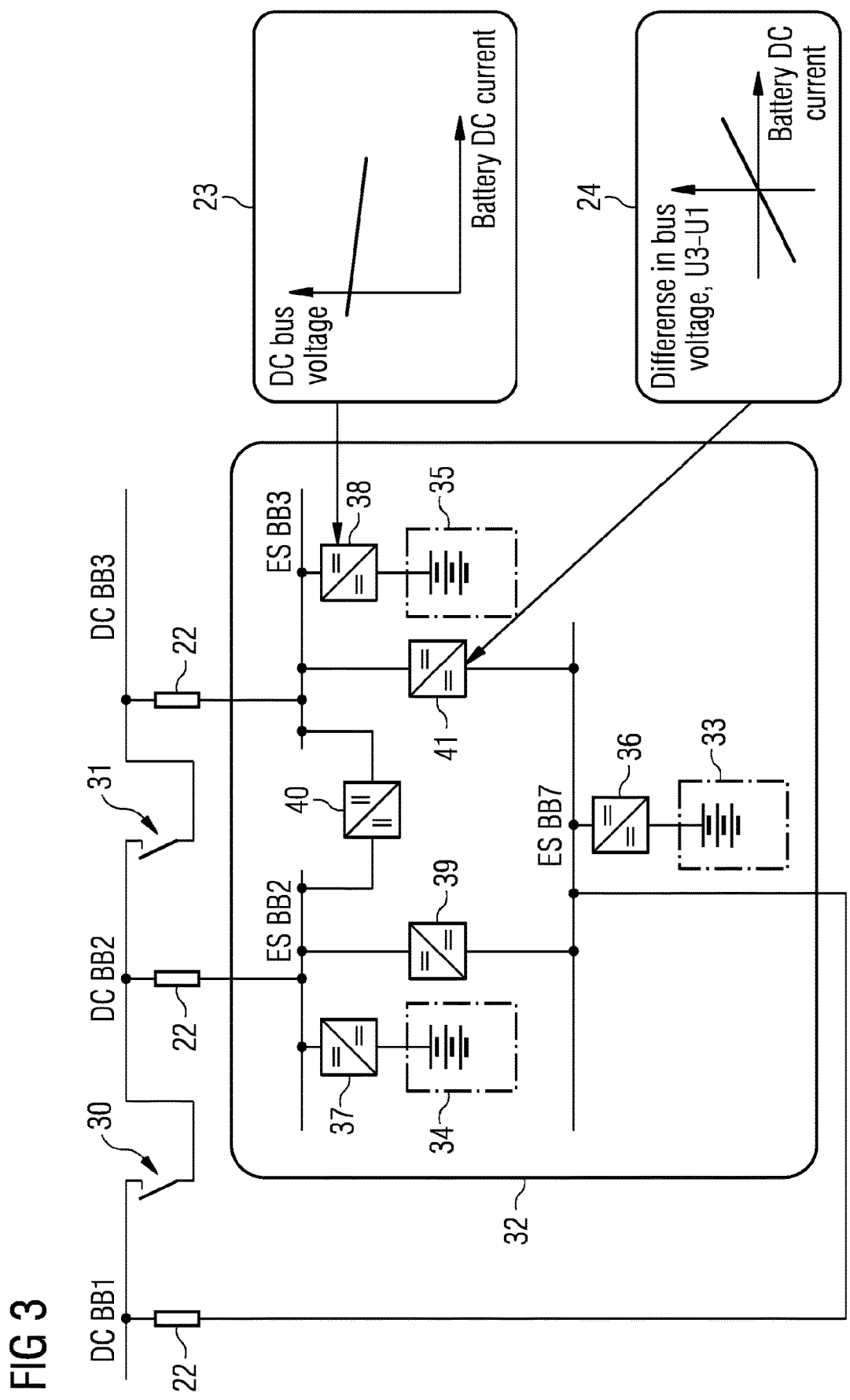
FIG. 3 illustrates a second example of part of the energy distribution system of FIG. 1 in more detail; and, FIG. 4 illustrates a third example of part of the energy distribution system of FIG. 1 in more detail.

A second example of an energy storage ring for use in an energy distribution system according to the present invention is illustrated in FIG. 3. Instead of the four DC busbars of FIG. 1, connected together in pairs, the example of FIG. 3 is suitable for use with three DC busbars which have an optional switch 30, 31 which allows the busbars to be connected together. In normal operation, those switches are closed. The energy storage ring 32 comprises three batteries 33, 34, 35 each with their corresponding DC/DC converter 36, 37, 38 between the battery and the busbar and choppers 39, 40, 41 between pairs of energy busbars ES BB1, ES BB2, ES BB3. The characteristics 23, 24 assume a current positive direction from the battery to the energy busbar and for chopper 41 from energy busbar ES BB3 to ES BB1. A similar assumption applies for chopper 40 (from ES BB2 to ES BB3 and for chopper 39 from ES BB1 to ES BB2. Each energy busbar ES BB1, ES BB2, ES BB3 is connected to its respective DC busbar DC BB1, DC BB2, DC BB3, via fuse 22.

The present invention has the benefit of providing increased robustness for the drilling system, with a decrease in overall energy consumption by reusing the energy and sharing between buses. This may reduce the demands made on the AC generators and prime movers. DC systems are most commonly used for offshore electrical applications and offshore drilling specifically. Another offshore application is on vessels that need high reliability. An example of this would be electric propulsion drives and thrusters in highly critical operation, i.e. DP3, for example, where there is a diver down and the vessel must be able to maintain station and power. With a system in which there are DC banks of propulsion drives in the vessel, all islands may be operated disconnected, with one thruster per island. In another example, illustrated in FIG. 4, there is physical separation of units in different locations on the vessel and separated by bulkheads or fire-resistant walls to protect against flood or fire. Equivalent parts are given the same labels as in FIG. 1.

In this example, two DC/DC converters are provided in each distinct area, so that faults do not propagate from one to another. Thus, rather than the first DC/DC converter between each bus on the ring and the second DC/DC converter from each bus to the energy storage, each distinct area has both a first and a third DC/DC converter. This allows for the diesel engines to be operated closer to full load, without all engines running, rather than operating at 15 to 20% load, as is currently the case when each separate area has to have an operational power source. If a fault occurs on an engine that is running, the battery banks in the energy storage ring cover the power requirement during the changeover period whilst another engine is started up. The converters in this example comprise choppers and the chopper type used on each end of the cable between the ES buses in FIG. 4 only requires a two-quadrant chopper 80, although a four-quadrant chopper 81 could be used. However, as this costs more, adds additional losses and takes up more space, it is better to use a two-quadrant chopper in this case.

By contrast, the battery choppers in FIGS. 2, 3 and 4 need to be four-quadrant choppers 81. The four DC busbars DC BB1, DC BB2, DC BB3, DC BB4 are equivalent to those of FIGS. 1 and 2. They connect via fuses 22 to energy ring bus DP zones. BB1 to zone 1 50, BB2 to zone 2 51, BB3 to zone 3 52 and BB4 to zone 4 53. In zone 1 50, energy busbar ES BB1 has two partial choppers 60, 61 to connect it to adjacent zones 2 and 3 51, 52, as well as a full chopper 54 between battery 70 and energy bus ES BB1. A connecting line or bus is provided between the partial choppers in different adjacent zones, i.e. between partial choppers 61, 62 in zones 50, 51, or between partial choppers 63, 64 in zones 51, 53 and similarly for the other choppers 65, 66, 67, 60 in their zones 53, 52, 50.

In zone 2 51, energy busbar ES BB2 has two partial choppers 62, 63 to connect it to adjacent zones 1 and 3 50, 52, as well as a full chopper 55 between battery 71 and energy bus ES BB2. In zone 3 52, energy busbar ES BB3 has two partial choppers 66, 67 to connect it to adjacent zones 1 and 4 50, 53, as well as a full chopper 56 between battery 72 and energy bus ES BB3. In zone 4 53, energy busbar ES BB4 has two partial choppers 64, 65 to connect it to adjacent zones 2 and 3 51, 52, as well as a full chopper 57 between battery 72 and energy bus ES BB4.

An electrical energy distribution system as hereinbefore described may be operated by detecting a voltage difference between an energy storage device and a DC bus and allowing current flow from the higher voltage to the lower voltage. The or each energy storage device may charge when there is an excess of energy on any of the DC buses and discharge to a consumer connected to any of the DC buses when the voltage of the DC bus is lower than the voltage of the energy bus for that energy storage device. Thus, the energy storage devices and power sources are used more efficiently by being shared.

Embodiments of the invention have been described with reference to different subject matter. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject matter, any combination of features relating to different subject matter, in particular between features of the method type claims and features of the apparatus type claims is considered to be disclosed by this document too.

It should be noted that the term "comprising" does not exclude other elements or steps and "a" or "an" does not exclude a plurality. Also, elements described in association with different embodiments may be combined. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar

The invention claimed is:

1. An electrical energy distribution system for a vessel or platform comprising:
   a plurality of DC buses and a plurality of energy storage buses, each DC bus coupled to a corresponding energy storage bus;
   each energy storage bus being coupled to a neighbouring energy storage bus of the system through a first DC/DC converter;
   wherein the plurality of energy storage buses are connected together to form a ring; and
   wherein each energy storage bus is further coupled to an energy store through a second DC/DC converter.

2. The system according to claim 1,
   wherein the first DC/DC converter comprises two pairs of parallel connected transistor diode arrangements connected through an inductor.

3. The system according to claim 1, further comprising:
   physically separated zones, each zone being coupled to one adjacent zone by the first DC/DC converter comprising one of a parallel connected transistor diode arrangement, or a pair of parallel connected transistor diode arrangements, and an inductor; and being coupled to the other adjacent zone by a third DC/DC converter comprising a pair of parallel connected transistor diode arrangements and an inductor.

4. The system according to claim 1,
   wherein the system comprises at least three DC buses and at least three energy storage buses.

5. The system according to claim 1, further comprising:
   at least a primary energy source;
   wherein the primary energy source comprises an AC generator connected to an AC bus;
   wherein the AC bus is coupled to the or each DC bus via a transformer and an AC to DC converter.

6. The system according to claim 1, further comprising:
   an intermediate AC bus at a lower voltage than the AC bus.

7. A The system according to claim 1,
   wherein the energy storage comprises one of a battery, a bank of batteries, capacitors, supercapacitors, or flywheels.

8. The system according to claim 1,
   wherein the plurality of DC buses comprise normally open switches between adjacent DC buses.

9. A method of operating an electrical energy distribution system according to claim 1, comprising:
   detecting a voltage difference between an energy storage device and a DC bus and allowing current flow from the higher voltage to the lower voltage.

10. The method according to claim 9,
    wherein the or each energy storage device charges when there is an excess of energy on any of the DC buses and discharges to a consumer connected to any of the DC buses when the voltage of the DC bus is lower than the voltage of the energy bus for that energy storage device.

* * * * *